US012614961B2

(12) United States Patent
Akiyama et al.

(10) Patent No.: US 12,614,961 B2
(45) Date of Patent: Apr. 28, 2026

(54) LINEAR MOTOR WITH SPECIFIC RATIOS OF DIMENSIONS

(71) Applicant: FUJI ELECTRIC CO., LTD., Kanagawa (JP)

(72) Inventors: Terukazu Akiyama, Tokyo (JP); Satoshi Imamori, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 280 days.

(21) Appl. No.: 18/337,821

(22) Filed: Jun. 20, 2023

(65) Prior Publication Data

US 2023/0421035 A1     Dec. 28, 2023

(30) Foreign Application Priority Data

Jun. 28, 2022    (JP) ................................. 2022-103723

(51) Int. Cl.
*H02K 41/02*          (2006.01)
(52) U.S. Cl.
CPC ......... *H02K 41/02* (2013.01); *H02K 2213/03* (2013.01)
(58) Field of Classification Search
CPC ...... H02K 41/02; H02K 41/03; H02K 41/031; H02K 2213/03
USPC ................................ 310/12.01, 12.22, 12.25
See application file for complete search history.

(56) References Cited

U.S. PATENT DOCUMENTS

| 2005/0173991 | A1* | 8/2005 | Watarai | .................. | H02K 41/03 |
| | | | | | 310/12.25 |
| 2010/0320847 | A1* | 12/2010 | Kakihara | ................. | H02K 1/18 |
| | | | | | 310/12.02 |
| 2011/0210689 | A1* | 9/2011 | Vogel | ................. | A61B 1/00158 |
| | | | | | 310/14 |
| 2018/0076675 | A1* | 3/2018 | Wakayama | .......... | H02K 41/031 |
| 2019/0245425 | A1* | 8/2019 | Kim | ......................... | H02K 1/17 |
| 2020/0266692 | A1* | 8/2020 | Trumper | .................. | H02K 1/34 |

FOREIGN PATENT DOCUMENTS

| JP | 2001-217183 | 8/2001 |
| JP | 2010-063201 | 3/2010 |
| JP | 2014-217090 | 11/2014 |

* cited by examiner

*Primary Examiner* — Michael Andrews
(74) *Attorney, Agent, or Firm* — IPUSA, PLLC

(57) ABSTRACT

A linear motor includes an armature and a field magnet that are disposed to face each other and configured to be subjected to relative movement. The armature includes a plurality of windings that are arranged along a direction of the relative movement. Each of the windings is wound around a first iron core. The field magnet includes a plurality of permanent magnets that are disposed to face both sides of the armature in a direction perpendicular to the direction of the relative movement, and are arranged along the direction of the relative movement. A ratio of a dimension of the first iron core to an arrangement pitch of the windings in the direction of the relative movement is in a range from 0.1 to 0.35.

11 Claims, 5 Drawing Sheets

1

LINEAR MOTOR WITH SPECIFIC RATIOS OF DIMENSIONS

CROSS-REFERENCE TO RELATED APPLICATIONS

This application is based on and claims priority to Japanese Patent Application No. 2022-103723, filed on Jun. 28, 2022, the entire contents of which are incorporated herein by reference.

BACKGROUND OF THE INVENTION

1. Field of the Invention

The disclosure herein relates to a linear motor.

2. Description of the Related Art

For example, linear motors that use permanent field magnets are known (see Patent Documents 1 to 3, for example).

There may be some restrictions on the types, grades, and the like of permanent magnets used for permanent field magnets. For example, instead of permanent magnets that use rare earth such as neodymium magnets, rare-earth-free permanent magnets such as ferrite magnets may need to be employed from the viewpoint of coercivity and cost. Therefore, it is desirable to make design considerations for the structure of a linear motor in order to obtain desired thrust even if magnets with a relatively small magnetic force (residual magnetic flux density) are used.

RELATED-ART DOCUMENTS

Patent Documents

Patent Document 1: Japanese Laid-open Patent Publication No. 2014-217090
Patent Document 2: Japanese Laid-open Patent Publication No. 2001-217183
Patent Document 3: Japanese Laid-open Patent Publication No. 2010-63201

SUMMARY OF THE INVENTION

It is desirable to provide a technique by which the thrust of a linear motor can be structurally improved.

According to an embodiment of the present disclosure, a linear motor includes an armature and a field magnet that are disposed to face each other and configured to be subjected to relative movement. The armature includes a plurality of windings that are arranged along a direction of the relative movement. Each of the windings is wound around a first iron core. The field magnet includes a plurality of permanent magnets that are disposed to face both sides of the armature in a direction perpendicular to the direction of the relative movement, and are arranged along the direction of the relative movement. A ratio of a dimension of the first iron core to an arrangement pitch of the windings in the direction of the relative movement is in a range from 0.1 to 0.35.

According to another embodiment of the present disclosure, a linear motor includes an armature and a field magnet that are disposed to face each other and configured to be subjected to relative movement. The armature includes a plurality of windings that are arranged along a direction of the relative movement. Each of the windings is wound around a first iron core. The field magnet includes a plurality of permanent magnets that are disposed to face both sides of the armature in a direction perpendicular to the direction of the relative movement, and are arranged along the direction of the relative movement. The permanent magnets and the windings are arranged in a 5-pole 6-slot configuration in the direction of the relative movement. A ratio of a dimension of the armature to a dimension of the linear motor in a direction in which the armature and the field magnet face each other is in a range from 0.47 to 0.61.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

In the following, embodiments of the present invention will be described with reference to the accompanying drawings.

[Overview of Linear Motor]

An overview of a linear motor 1 according an embodiment will be described with reference to FIG. 1 and FIG. 2.

Figure 1:
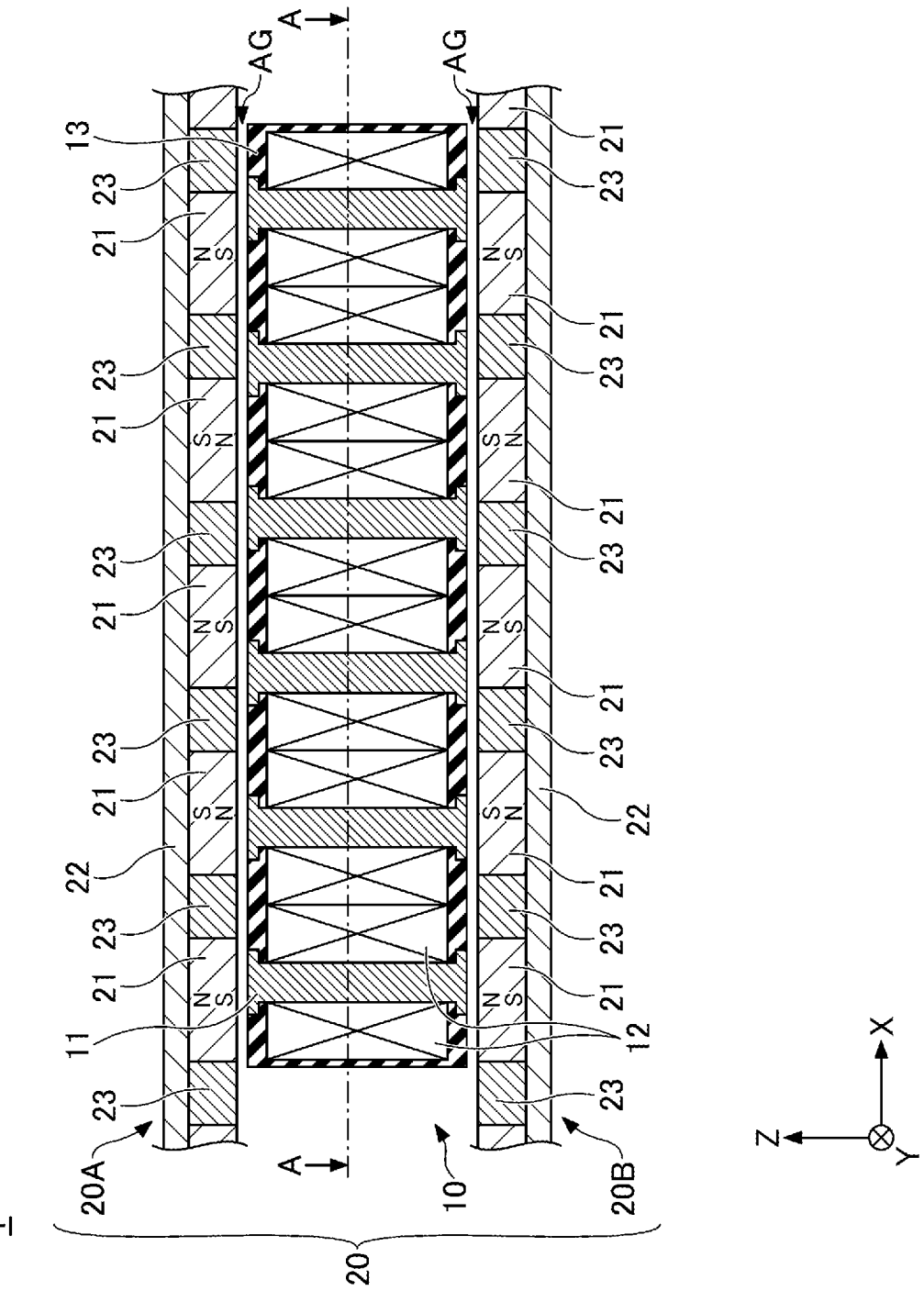
FIG. 1 is a side cross-sectional view of an example of a linear motor.

FIG. 1 is a side cross-sectional view of an example of the linear motor 1. Specifically, FIG. 1 is a cross-sectional view of the linear motor 1 taken along a plane parallel to the X-axis and the Z-axis. FIG. 2 is a plan cross-sectional view of an example of an armature 10. Specifically, FIG. 2 is a cross-sectional view of the armature 10 taken through A-A of FIG. 1.

In the following description, an orthogonal coordinate system defined by the X-axis, the Y-axis, and the Z-axis in the drawings may be used. Further, a positive X-axis direction and a negative X-axis direction may be collectively referred to as an X-axis direction. A positive Y-axis direction and a negative Y-axis direction may be collectively referred to as a Y-axis direction. A positive Z-axis direction and a negative Z-axis direction may be collectively referred to as a Z-axis direction.

The linear motor 1 according to the present embodiment may be incorporated into any of opening/closing mechanisms of various sliding doors, such as railway vehicle doors and platform doors of railway stations. The linear motor 1 according to the present embodiment may be mounted, for example, in a machine tool such as a semiconductor manufacturing apparatus or a machining center.

Figure 2:
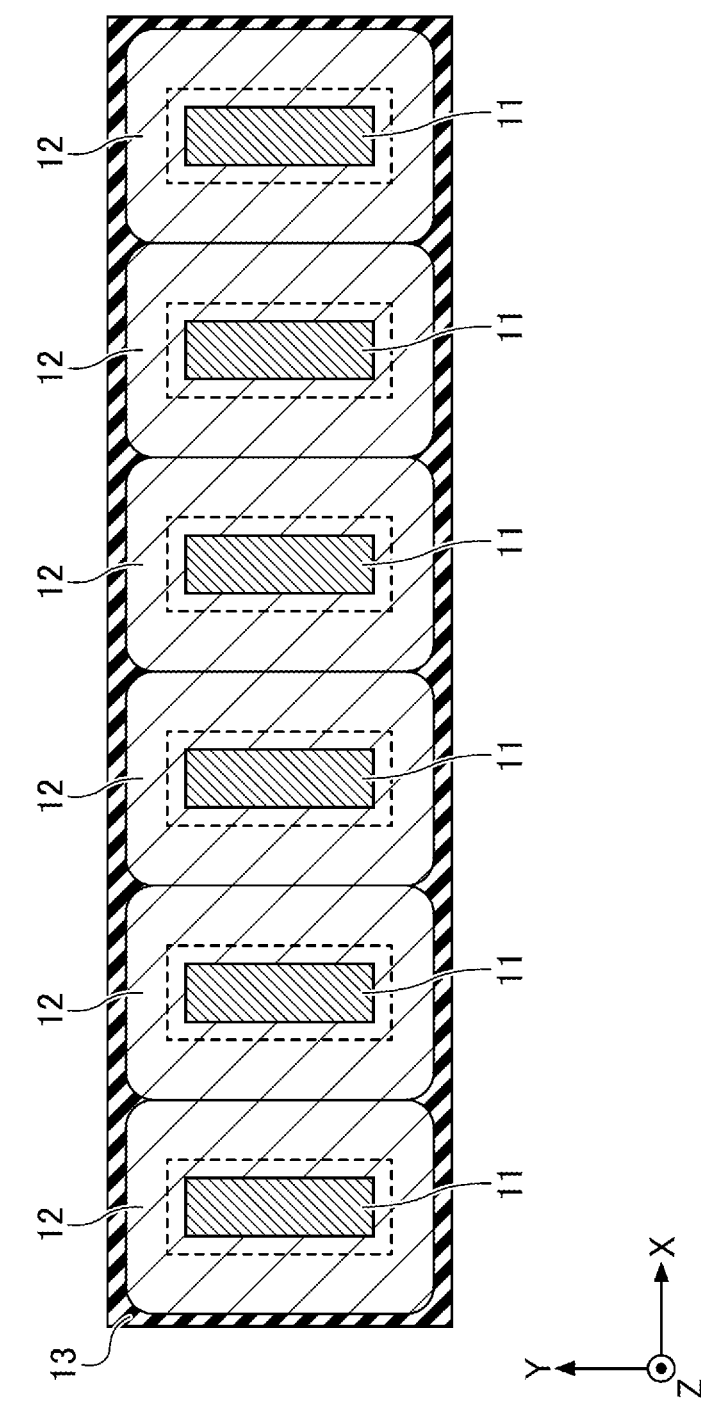
FIG. 2 is a plan cross-sectional view of an example of an armature.

As illustrated in FIG. 1 and FIG. 2, the linear motor 1 includes the armature 10 and a field magnet 20. In FIG. 1, letters "N" and "S" indicated on the field magnet 20 represent magnetic poles (an N-pole and an S-pole) of a permanent magnet 21. In FIG. 2, a dashed line indicated on the armature 10 represents the cross-sectional shape of each end of a core 11 in the Z-axis direction.

The armature 10 is disposed such that the positive Z-axis side and the negative Z-axis side of the armature 10 face a field magnet section 20A and a field magnet section 20B, respectively, via predetermined gaps (also referred to as "air gaps") AG. In this example, the armature 10 is a mover. The armature 10 is supported such that the armature 10 is movable in the X-axis direction by, for example, a support mechanism such as a slide rail or a linear guide. Therefore, the armature 10 can move in the X-axis direction by a force magnetically acting between the armature 10 and the field magnet 20. The armature 10 includes the core (also referred to as an "iron core") 11, a coil (also referred to as a "winding") 12, and a holding section 13.

The core 11 functions as a magnetic path of a magnetic field generated by the armature current of the coil 12 and a magnetic field from the permanent magnet 21 of the field magnet 20. The core 11 is formed of a soft magnetic material. The soft magnetic material used for the core 11 is, for example, an iron-based material such as cast iron or structural steel. The soft magnetic material used for the core 11 may be a functional material such as an electromagnetic steel plate or a magnetic powder core. In this example, a plurality of (six) cores 11 are provided, and the number of the cores 11 are the same as the number of coils 12.

For example, as illustrated in FIG. 1 and FIG. 2, each of the cores 11 has a rectangular column shape extending in the Z-axis direction, and is formed so as to have a larger cross-sectional shape at both ends than in the center in the Z-axis direction. With this configuration, for example, even if the cores 11 attempt to move in the positive Z-axis direction, the ends on the negative Z-axis side of the cores 11 contact the holding section 13, thereby preventing the cores 11 from moving in the positive Z-axis direction. Therefore, falling-off of the cores 11 from the armature 10 due to the movement of the cores 11 in the positive Z-axis direction can be avoided. In addition, falling-off of the cores 11 from the armature 10 due to the movement of the cores 11 in the negative Z-axis direction can also be avoided by the same effect.

When the armature current flows through each of the coils 12, thrust is generated in the mover (armature 10) by the interaction with a magnetic field generated from each of the magnet sections 20A and 20B. The coils 12 are formed by winding conductive wires around the cores 11.

In this example, the plurality of (six) coils 12 are provided. The plurality of coils 12 are arranged in the X-axis direction. For example, three-phase alternating current (AC) power of U-phase, V-phase, and W-phase is supplied to the plurality of coils 12. Specifically, in FIG. 1, the three-phase AC power may be supplied from a coil 12, located at the end on the negative X-axis side, toward the positive X-axis side in the order of the U-phase (+), U-phase (–), V-phase (–), V-phase (+), W-phase (+) and W-phase (–).

An insulating section (not illustrated) is provided between each of the cores 11 and a corresponding coil 12 (conductive wire) so as to ensure mutual insulation. The insulating section is, for example, an insulating member that ensures insulation between each of the cores 11 and the corresponding coil 12, such as insulating paper, an insulator, a bobbin, or an insulating coating on the surface of each of the cores 11. The insulating coating of each of the cores 11 is, for example, insulation powder coating. The insulating section may be an insulation film coated on the conductive wire of the corresponding coil 12.

The holding section 13 integrally holds the plurality of cores 11 and the plurality of coils 12. The holding section 13 is formed of a mold resin, and both ends of each of the cores 11 in the axial direction (in the Z-axis direction) are held so as to be exposed from the holding section 13.

The field magnet 20 generates a magnetic field acting on the armature 10. In this example, the field magnet 20 is a stator. As illustrated in FIG. 1, the field magnet 20 extends in the X-axis direction, and the dimension of the field magnet 20 in the X-axis direction is defined in accordance with the amount of movement of the armature 10, which serves as the mover, in the X-axis direction.

The field magnet 20 includes the field magnet sections 20A and 20B.

The field magnet sections 20A and 20B extend in the X-axis direction substantially parallel to each other. The term "substantially" is intended to tolerate a manufacturing error and the like and is used in the same meaning in the following. A predetermined space is provided between the field magnet sections 20A and 20B in the Z-axis direction, and the space is set to be greater than the dimension of the armature 10 in the Z-axis direction to some extent. For example, the space between the field magnet sections 20A and 20B corresponds to an amount calculated by adding the movable amount of the support mechanism (e.g., the slide rail or the linear guide) of the armature 10 in the Z-axis direction and a predetermined margin to the dimension of the armature 10 in the Z-axis direction. Accordingly, the armature 10, which serves as the mover, can move in the X-axis direction without contacting the field magnet sections 20A and 20B.

The field magnet section 20A and the field magnet section 20B are disposed to face the positive Z-axis side and the negative Z-axis side of the armature 10, respectively. Each of the field magnet sections 20A and 20B generates magnetic flux linked with the plurality of coils 12 of the armature 10.

Each of the field magnet sections 20A and includes a plurality of permanent magnets 21, a back yoke 22, and a soft magnetic member 23.

The plurality of permanent magnets 21 are arranged in the X-axis direction so as to face the armature 10 in the Z-axis direction. For example, as illustrated in FIG. 1, the plurality of permanent magnets 21 are arranged in the X-axis direction at substantially equal intervals, and each of the permanent magnets 21 has a substantially rectangular parallelepiped shape having sides extending along the X-axis direction, the Y-axis direction, and the Z-axis direction. The plurality of permanent magnets 21 are magnetized in the Z-axis direction in which the field magnet 20 and the armature 10 face each other. Further, the plurality of permanent magnets 21 are disposed such that the magnetic poles of the end surfaces, on the Z-axis side facing the armature 10, of permanent magnets 21 that are adjacent to each other in the X-axis direction differ from each other.

The permanent magnets 21 are rare-earth-free permanent magnets, that is, permanent magnets that do not use rare earth (rare earth elements) at all. For example, the permanent magnets 21 are lanthanum-free permanent magnets, that is, ferrite magnets or the like that do not use lanthanum. The permanent magnets 21 may be rare-metal-free permanent magnets, that is, permanent magnets that do not use rare metal including rare earth at all. For example, the permanent magnets 21 are lanthanum-free and cobalt-free ferrite magnets or the like, that is, ferrite magnets that do not use lanthanum and cobalt at all.

The field magnet section 20A and the field magnet section 20B are configured such that the magnetic specifications (e.g., the shape, the dimensions, the residual magnetic flux density, and the like) and the arrangement specifications (e.g., the arrangement positions of the permanent magnets 21 in the X-axis direction, a manner of arrangement including the presence or absence of the Halbach array, and the like) of the permanent magnets 21 are substantially the same. Accordingly, the field magnet section 20A and the field magnet section 20B can generate substantially symmetrical magnetic fields in the space between the field magnet section 20A and the field magnet section 20B, which face each other in the Z-axis direction.

The back yoke 22 is disposed adjacent to the end surfaces of the permanent magnets 21 opposite to the end surfaces facing the armature 10 in the Z-axis direction. The back yoke 22 functions as a magnetic path between permanent magnets 21 that are adjacent to each other. The back yoke 22 is formed of a soft magnetic material. The soft magnetic material used for the back yoke 22 is, for example, an iron-based material such as cast iron or structural steel. The soft magnetic material used for the back yoke 22 may be a functional material such as an electromagnetic steel plate or a magnetic powder core.

The soft magnetic member 23 is formed of a soft magnetic material, and is disposed between and in contact with permanent magnets 21 that are adjacent to each other in the X-axis direction. For example, the soft magnetic material is an iron-based material such as cast iron or structural steel. The soft magnetic material may be a functional material such as an electromagnetic steel plate or a magnetic powder core. For example, as illustrated in FIG. 1, the soft magnetic member 23 has a substantially rectangular parallelepiped shape having sides extending in the X-axis direction, the Y-axis direction, and the Z-axis direction. Both ends of the soft magnetic member 23 in the X-axis direction contact the permanent magnets 21 that are adjacent to each other. Accordingly, the field magnet sections 20A and 20B can have saliency in which the magnetic reluctance with respect to the magnetic field of the armature 10 varies in the X-axis direction, which is the moving direction of the mover (armature 10). Therefore, the linear motor 1 can utilize, as thrust, not only the magnetic force between the armature 10 and the field magnet 20, but also the reluctance force. Accordingly, the thrust of the linear motor 1 can be improved. Further, by utilizing the saliency of the field magnet 20 (field magnet sections 20A and 20B), the position of the mover (armature 10) in the X-axis direction can be estimated, and thus, sensors such as encoders for detecting the position of the armature 10 can be omitted.

As illustrated in FIG. 1, the permanent magnet 21 of the field magnet 20 and the coils 12 of the armature 10 are arranged in a 5-pole 6-slot configuration in the X-axis direction. Specifically, the permanent magnets 21 and the coils 12 are arranged such that the number of coils 12 (number of slots) is 6 in a section where the number of permanent magnets 21 (number of magnetic poles) is 5 in the X-axis direction.

[Structure of Linear Motor]

Next, the structure of the linear motor 1 according to the present embodiment will be described with reference to FIG. 3 through FIG. 5.

Figure 3:
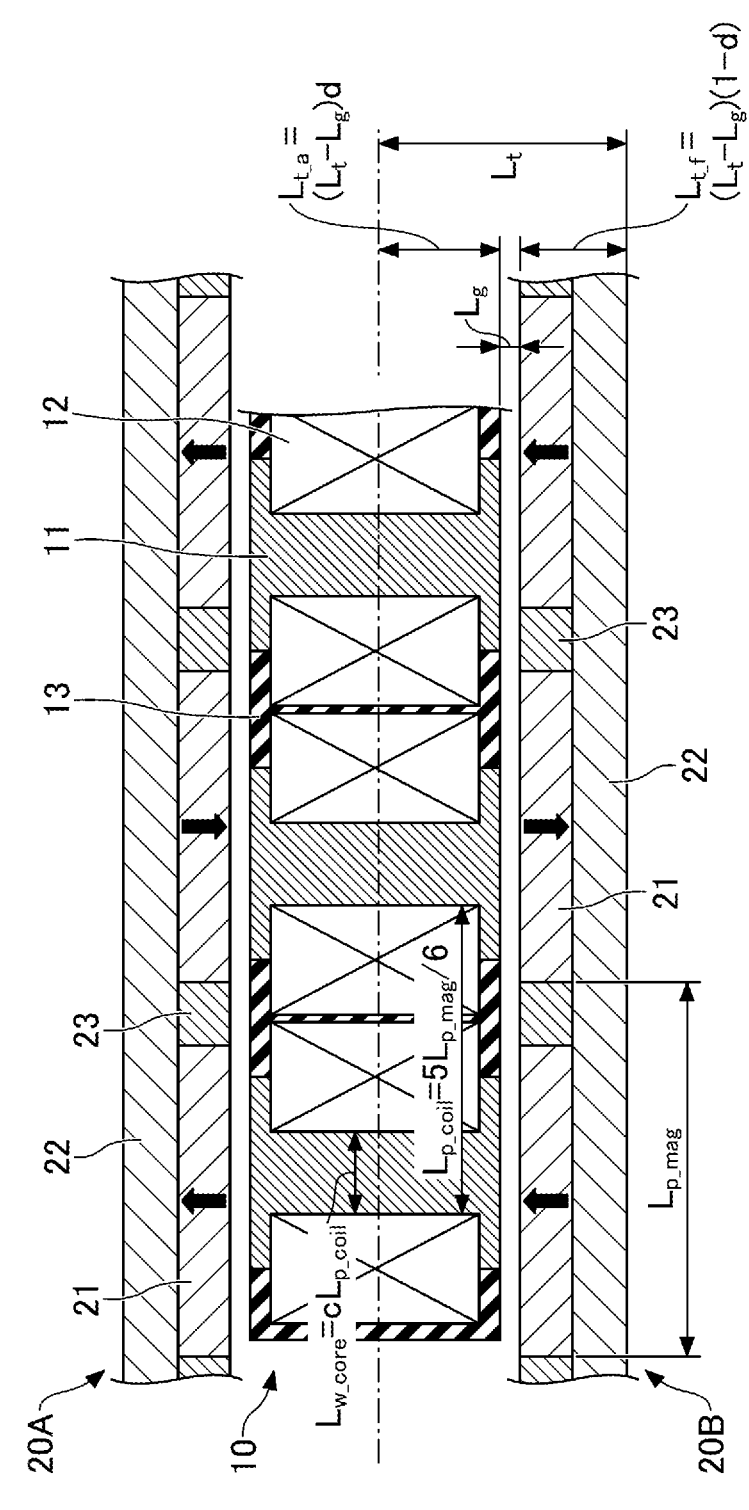
FIG. 3 is a diagram illustrating the dimensions of components of the linear motor related to the performance (thrust) of the linear motor.

FIG. 3 is a diagram illustrating the dimensions of components of the linear motor 1 related to the performance (thrust) of the linear motor 1. FIG. 4 is a graph illustrating example analytical results of the relationship between the ratio (parameter c) of a width $L_{w\_core}$ of each of the cores 11 to a coil pitch $L_{p\_coil}$ and the thrust of the linear motor 1. FIG. 5 is a graph illustrating example analytical results of the relationship between the ratio (parameter d) of the thickness of the armature 10 to the thickness of the linear motor 1 and the thrust of the linear motor 1.

In FIG. 3, a magnetic pole pitch $L_{p\_mag}$ represents the arrangement pitch of the permanent magnets 21 in the X-axis direction. Further, in FIG. 3, the coil pitch $L_{p\_coil}$ represents the arrangement pitch of the coils 12 in the X-axis direction. Further, in FIG. 3, the width $L_{w\_core}$ represents the dimension, in the X-axis direction, of the center, in the Z-axis direction, of each of the cores 11. Further, in FIG. 3, a representative thickness $L_t$ of the linear motor 1 represents the dimension of the linear motor 1 in the Z-axis direction. Specifically, the representative thickness $L_t$ of the linear motor 1 represents half the dimension between the respective ends of the field magnet sections 20A and 20B in the Z-axis direction. Further, in FIG. 3, a representative thickness $L_{t\_a}$ of the armature 10 represents half the thickness of the armature 10 in the Z-axis direction. Further, in FIG. 3, a representative thickness $L_{t\_f}$ represents the dimension of each of the field magnet sections 20A and 20B in the Z-axis direction. Further, in FIG. 3, a gap length $L_g$ represents the dimension of each of the gaps AG in the Z-axis direction when the center of the armature 10 in the Z-axis direction coincides with the center of the linear motor 1 in the Z-axis direction (that is, the center of the field magnet 20 in the Z-axis direction). FIG. 4 and FIG. 5 illustrate the analytical results at 20° C. corresponding to a normal temperature, −35° C. corresponding to a lower limit, and 70° C. corresponding to an upper limit within a temperature range of the linear motor 1 in which the operation is tolerable (hereinafter referred to as an "operation-tolerable temperature range"). Further, in FIG. 4 and FIG. 5, the thrust of the linear motor 1 is indicated as the ratio of the thrust of the linear motor 1 to the thrust of a reference linear motor. The reference linear motor is, for example, a predetermined linear motor that uses rare earth such as neodymium magnets.

First Example

In this example, the ratio (parameter c) of the width $L_{w\_core}$ of each of the core 11 to the coil pitch $L_{p\_coil}$ will be described as a structural parameter related to the performance of the linear motor 1.

In general, as the physical size of (the volume occupied by) the coils 12 increases, the thrust of the linear motor 1 increases. Therefore, it is desirable for the physical size of the coils 12 in the X-axis direction to be relatively large. Conversely, if the physical size of the coils 12 in the X-axis direction becomes relatively large and the dimension ($L_{w\_core}$) of each of the cores 11 in the X-axis dimension becomes too small, the thrust of the linear motor 1 would decrease due to magnetic saturation.

Accordingly, it is desirable for the parameter c to be set in an appropriate range from the viewpoint of improving the thrust of the linear motor 1.

Figure 4:
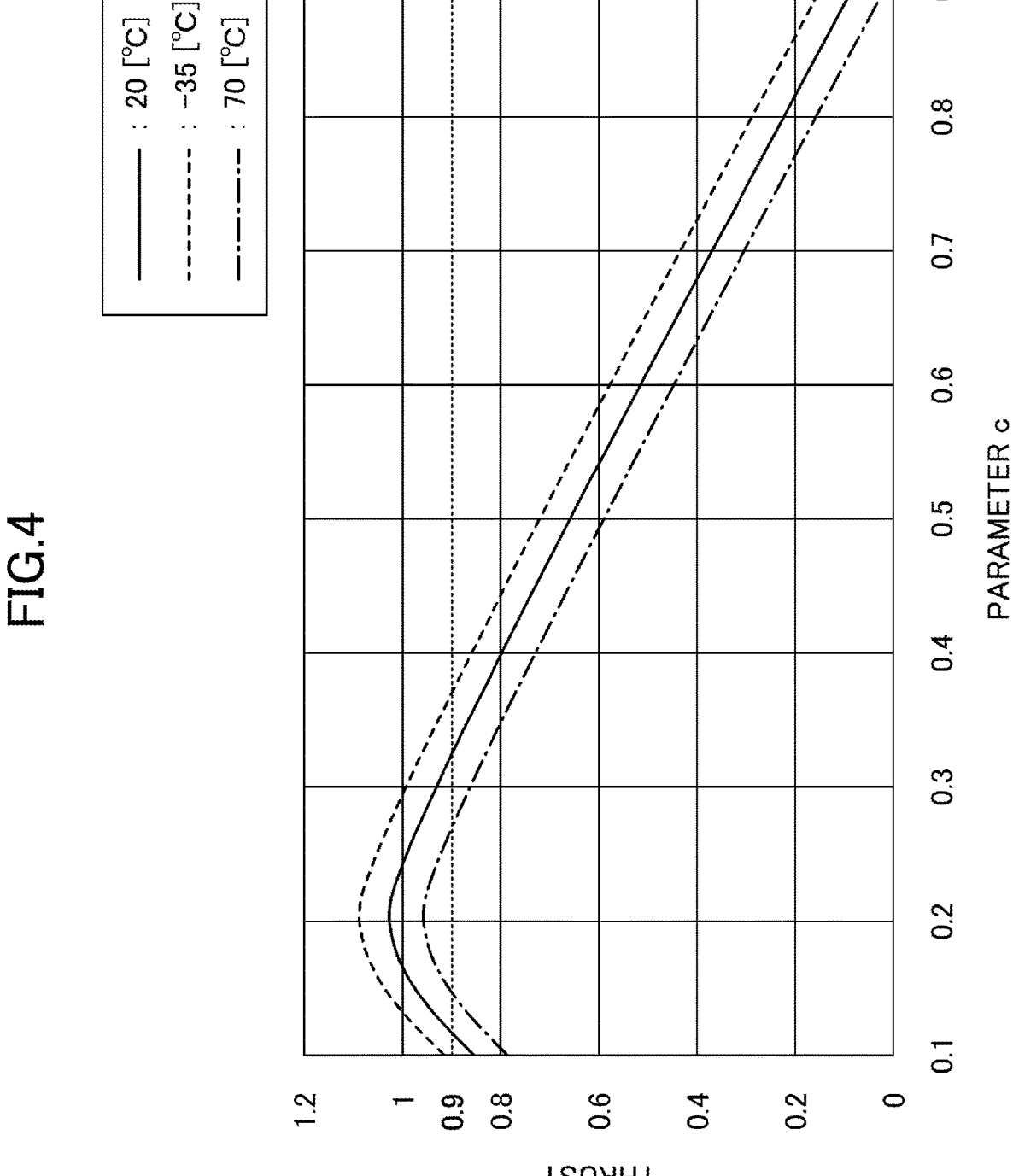
FIG. 4 is a graph illustrating example analytical results of the relationship between the ratio of the width of a core to a coil pitch and the thrust of the linear motor.

As illustrated in FIG. 4, in this example, the thrust takes the maximum value when the parameter c is approximately 0.2. Therefore, for example, the structure of the cores 11 and the coils 12 is determined such that the parameter c falls within a range ($0.18 \le c \le 0.22$) centered at 0.2 and with a tolerance of ±2% (±0.02) within the entire possible range ($0 < c < 1$).

In some cases, for example, it may be sufficient for the linear motor 1 to achieve a certain level of thrust relative to that of the reference linear motor such as a linear motor using rare earth. In such a case, for example, the structure of the cores 11 and the coils 12 is determined such that the parameter c falls within a range (0.1≤c≤0.35) in which the thrust of the linear motor 1 is approximately 80% or more of the thrust of the reference linear motor throughout the entire operation-tolerable temperature range of the linear motor 1. The structure of the cores 11 and the coils 12 may be determined such that the parameter c falls within a range (0.15≤c≤0.25) in which of the linear motor 1 is approximately 90% or more of the thrust of the reference linear motor throughout the entire operation-tolerable temperature range of the linear motor 1.

As described, the thrust of the linear motor 1 can be improved by appropriately adjusting the parameter c to be within a range based on approximately 0.2, while also taking other requirements and the like into account. In particular, even when rare-metal-free magnets or rare-earth-free magnets having a relatively small magnetic force (residual magnetic flux density) are used as the permanent magnets 21, the thrust of the linear motor 1 can be made structurally relatively high.

Second Example

In this example, the ratio (parameter d) of the thickness of the armature 10 to the thickness of the linear motor 1 in the Z-axis direction will be described as a structural parameter related to the performance of the linear motor 1.

In general, as the physical size of (the volume occupied by) the coils 12 increases, the thrust of the linear motor 1 increases. Therefore, it is desirable for the physical size of the armature 10 in the Z-axis direction to be relatively large.

Conversely, if the physical size of the armature 10 becomes too large, the thrust of the linear motor 1 would decrease as a result of demagnetization of the field magnet 20 (permanent magnets 21) due to the magnetic field from the armature 10.

Accordingly, it is desirable for the parameter d to be set in an appropriate range from the viewpoint of improving the thrust of the linear motor 1.

Figure 5:
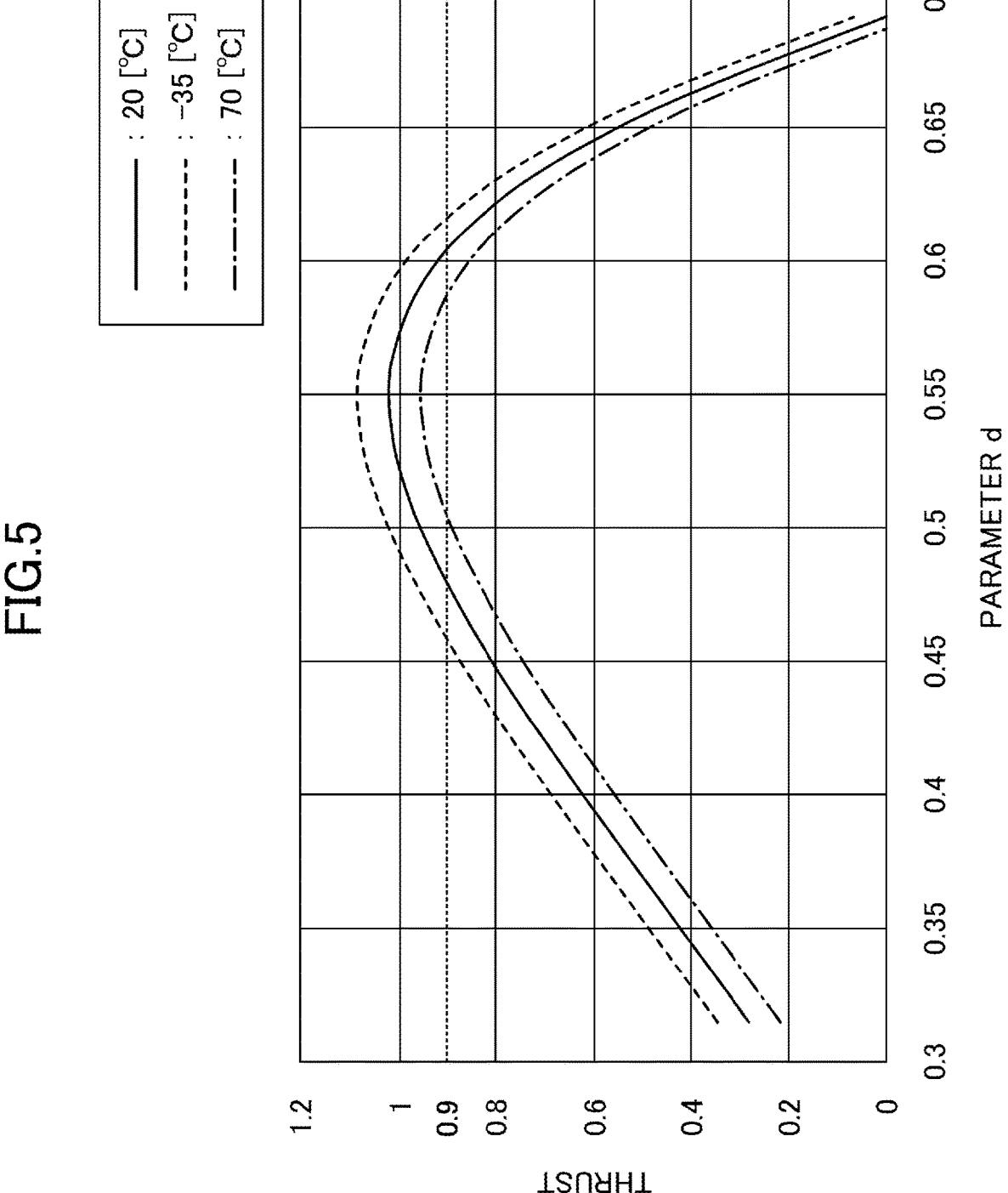
FIG. 5 is a graph illustrating example analytical results of the relationship between the ratio of the thickness of the armature to the thickness of the linear motor and the thrust of the linear motor.

As illustrated in FIG. 5, in this example, the thrust takes the maximum value when the parameter d is approximately 0.55. Therefore, for example, the structure of the cores 11 and the coils 12 is determined such that the parameter d falls within a range (0.53≤d≤0.57) centered at 0.55 and with a tolerance of ±2% within the entire possible range (0<d<1).

In some cases, for example, it may be sufficient for the linear motor 1 to achieve a certain level of thrust relative to that of the reference linear motor such as a linear motor using rare earth. In such a case, for example, the structure of the cores 11 and the coils 12 is determined such that the parameter d is within a range (0.47≤d≤0.61) in which the thrust of the linear motor 1 is approximately 80% or more of the thrust of the reference linear motor throughout the entire operation-tolerable temperature range of the linear motor 1. The structure of the cores 11 and the coils 12 may be determined such that the parameter d is within a range (0.5≤d≤0.58) in which the thrust of the linear motor 1 is approximately 90% or more of the thrust of the reference linear motor throughout the entire operation-tolerable temperature range of the linear motor 1.

As described, the thrust of the linear motor 1 can be improved by appropriately adjusting the parameter d to be within a range based on approximately 0.55, while also taking other requirements and the like into account. In particular, even when rare-metal-free magnets or rare-earth-free magnets having a relatively small magnetic force (residual magnetic flux density) are used as the permanent magnets 21, the thrust of the linear motor 1 can be made structurally relatively high.

OTHER EMBODIMENTS

Next, other embodiments will be described.

The above-described embodiment may be appropriately varied or modified.

For example, in the above-described embodiment, the structure of the linear motor 1 may be determined by taking either the parameter c or the parameter d into account. Alternatively, the structure of the linear motor 1 may be determined by taking both the parameter c and the parameter d into account.

In the above-described embodiment and variations and modifications thereof, the permanent magnets 21 may be permanent magnets that use rare earth or rare metal. For example, the permanent magnets 21 may be neodymium magnets or may be ferrite magnets that use cobalt or lanthanum. In this case, for example, even under restricted conditions in which low-grade permanent magnets 21 need be used, the thrust of the linear motor 1 can be structurally improved by taking the parameter c and the parameter d into account.

In the above-described embodiment and variations and modifications thereof, the number of coils 12 of the armature 10 may be a multiple of 6 and greater than or equal to 7, as long as the permanent magnets 21 and the coils 12 are arranged in a 5-pole 6-slot configuration in the X-axis direction.

In the above-described embodiment and variations and modifications thereof, the back yoke 22 and the soft magnetic member 23 may be integrated and constituted by one member.

In the above-described embodiment and variations and modifications thereof, the back yoke 22 may be omitted.

In the above-described embodiment, and variations and modifications thereof, the soft magnetic member 23 may be omitted.

In the above-described embodiment and variations and modifications thereof, in the linear motor 1, the armature 10 may be a stator and the field magnet 20 may be a mover. In this case, the armature 10 is provided so as to extend between both ends of a movable range in the X-axis direction. In addition, the field magnet sections 20A and 20B of the field magnet 20 are coupled so as to surround the armature 10 in the Z-axis direction and the Y-axis direction. Further, each of the field magnet sections 20A and 20B includes the permanent magnets 21 whose number is a multiple of 5, and the permanent magnets 21 and the coils 12 of the armature 10 are arranged in a 5-pole 6-slot configuration.

In the above-described embodiment and variations and modifications thereof, at least a portion of a moving path of the mover of the linear motor 1 may include a path that extends along a curve.

Effects

Next, effects of the linear motor according to the above-described embodiment will be described.

According to an embodiment, a linear motor includes an armature and a field magnet that are disposed to face each other and configured to be subjected to relative movement. The linear motor is, for example, the above-described linear motor 1. The armature and the field magnet are the above-described armature 10 and the above-described field magnet 20, respectively. Specifically, the armature includes a plurality of windings that are arranged along a direction of the relative movement. Each of the windings is wound around a first iron core. The first iron core is, for example, each of the above-described cores 11. The windings are, for example, the above-described coils 12. The direction of the relative movement is, for example, the above-described X-axis direction. The field magnet includes a plurality of permanent magnets that are disposed to face both sides of the armature in a direction perpendicular to the direction of the relative movement, and are arranged along the direction of the relative movement. The permanent magnet is, for example, the above-described permanent magnets 21. The direction perpendicular to the direction of the relative movement is, for example, the above-described Z-axis direction. The permanent magnets and the windings are arranged in a 5-pole 6-slot configuration in the direction of the relative movement. A ratio (parameter c) of a dimension of the first iron core to an arrangement pitch of the windings in the direction of the relative movement may be in a range from 0.1 to 0.35.

Accordingly, the structure of the windings and the first iron cores can be determined such that the parameter c falls within a range based on approximately 0.2, and as a result, the thrust of the linear motor 1 can be structurally improved.

Further, according to the embodiment, a ratio (parameter d) of a dimension of the armature to a dimension of the linear motor in a direction in which the armature and the field magnet face each other may be in a range from 0.47 to 0.61.

Accordingly, the structure of the armature and the field magnet can be determined such that the parameter d falls within a range based on approximately 0.55, and as a result, the thrust of the linear motor 1 can be structurally improved.

Further, according to the embodiment, the parameter c may be in a range from 0.15 to 0.25.

Accordingly, the thrust of the linear motor 1 can be structurally improved.

Further, according to the embodiment, the parameter d may be in a range from 0.5 to 0.58.

Accordingly, the thrust of the linear motor 1 can be structurally improved.

Further, according to the embodiment, the field magnet may include a second iron core and a third iron core. The second iron core is, for example, the above-described back yoke 22. The third iron core is, for example, the above-described soft magnetic member 23. Specifically, the second iron core may be disposed on a side of the permanent magnets opposite to a side facing the armature so as to be adjacent to all of the permanent magnets that are arranged along the direction of the relative movement. The third iron core may be disposed between and in contact with permanent magnets that are adjacent to each other in the direction of the relative movement.

Accordingly, the thrust of the linear motor 1 can be structurally improved.

Further, according to the embodiment, the permanent magnets may be rare-earth-free magnets.

Accordingly, even when rare-earth-free permanent magnets having a relatively small residual magnetic flux density are used, the thrust of the linear motor 1 can be structurally improved.

Further, according to the embodiment, the permanent magnets may be rare-metal-free magnets.

Accordingly, even when rare-metal-free permanent magnets having a relatively small residual magnetic flux density are used, the thrust of the linear motor 1 can be structurally improved.

Further, according to the embodiment, the permanent magnets may be lanthanum-free and cobalt-free ferrite magnets.

Accordingly, even when lanthanum-free and cobalt-free ferrite magnets having a relatively small residual magnetic flux density are used, the thrust of the linear motor 1 can be structurally improved.

According to the above-described embodiment, the thrust of the linear motor can be structurally improved.

Although the embodiments have been described in detail above, the present disclosure is not limited to the particulars of the described embodiments, and various modifications and alterations can be made within the scope of the claimed subject matter.

For example, any number of magnetic poles and any number of slots may be combined. Instead of the combination of the number of magnetic poles and the number of slots (5 poles and 6 slots) described in the embodiments, a combination of 2 poles and 3 slots, a combination of 4 poles and 3 slots, a combination of 7 poles and 6 slots, or the like may be used. In general, with the same winding pitch, the smaller the least common multiple of the number of poles and slots, the lower the cost because the number of parts is reduced, and the greater the least common multiple of the number of poles and slots, the greater the thrust.

Note that, when considering the thrust, it is necessary to consider the winding factor as well. When winding factors for the combination of 5 poles and 6 slots (the combination of the number of magnetic poles and the number of slots described in the embodiments) and the combination of 7 poles and 6 slots are compared, the winding factors are the same for these combinations if coils of armatures are wound by the same method. That is, for the combination of 5 poles and 6 slots and the combination of 7 poles and 6 slots, the same thrust can be obtained. Accordingly, it can be said that the combination of the number of magnetic poles and the number of slots (5 poles and 6 slots) described in the embodiments can be expected to reduce the cost while maintaining the thrust of the linear motor.

What is claimed is:

1. A linear motor comprising:

an armature and a field magnet that are disposed to face each other and configured to be subjected to relative movement, wherein the armature includes a plurality of windings that are arranged along a direction of the relative movement, each of the windings being wound around a first iron core, wherein the field magnet includes a plurality of permanent magnets that are disposed to face both sides of the armature in a direction perpendicular to the direction of the relative movement, and are arranged along the direction of the relative movement, wherein S poles and N poles of the plurality of permanent magnets are respectively arranged along the direction perpendicular to the direction of the relative movement, wherein a ratio of a dimension of the first iron core to an arrangement pitch of the windings in the direction of the relative movement is in a range from 0.1 to 0.35, wherein the first iron core has a central portion and end portions respectively positioned on two sides of the central portion along the direction perpendicular to the relative movement, wherein each of a cross-sectional shape of the end portions has an area normal to the direction perpendicular to the relative movement greater than a cross-sectional area of the central portion normal to the direction perpendicular to the relative movement, and wherein a width of the central portion along the direction of the relative movement is uniform.

2. The linear motor according to claim 1, wherein the ratio is in a range from 0.15 to 0.25.

3. The linear motor according to claim 1, wherein the field magnet includes a second iron core and a third iron core, the second iron core is disposed on a side of the plurality of permanent magnets opposite to a side facing the armature so as to be adjacent to all of the plurality of permanent magnets that are arranged along the direction of the relative movement, and the third iron core is disposed between and in contact with permanent magnets of the plurality of permanent magnets, the permanent magnets of the plurality of permanent magnets being adjacent to each other in the direction of the relative movement.

4. The linear motor according to claim 1, wherein the plurality of permanent magnets are rare-earth-free magnets.

5. The linear motor according to claim 4, wherein the plurality of permanent magnets are rare-metal-free magnets.

6. The linear motor according to claim 5, wherein the plurality of permanent magnets are lanthanum-free and cobalt-free ferrite magnets.

7. The linear motor according to claim 1, wherein the plurality of permanent magnets and the windings are arranged in a 5-pole 6-slot configuration in the direction of the relative movement.

8. The linear motor according to claim 1, wherein three-phase alternating current (AC) power is supplied to the plurality of windings.

9. A linear motor comprising:

an armature and a field magnet that are disposed to face each other and configured to be subjected to relative movement, wherein the armature includes a plurality of windings that are arranged along a direction of the relative movement, each of the windings being wound around a first iron core, wherein the field magnet includes a plurality of permanent magnets that are disposed to face both sides of the armature in a direction perpendicular to the direction of the relative movement, and are arranged along the direction of the relative movement, wherein S poles and N poles of the plurality of permanent magnets are respectively arranged along the direction perpendicular to the direction of the relative movement, wherein a ratio of a dimension of the armature to a dimension of the linear motor in a direction in which the armature and the field magnet face each other is in a range from 0.47 to 0.61, wherein the first iron core has a central portion and end portions respectively positioned on two sides of the central portion along the direction perpendicular to the relative movement, wherein each of a cross-sectional shape of the end portions has an area normal to the direction perpendicular to the relative movement greater than a cross-sectional area of the central portion normal to the direction perpendicular to the relative movement, and wherein a width of the central portion along the direction of the relative movement is uniform.

10. The linear motor according to claim 9, wherein the ratio is in a range from 0.5 to 0.58.

11. The linear motor according to claim 9, wherein three-phase alternating current (AC) power is supplied to the plurality of windings.

* * * * *